Aug. 9, 1927.
C. A. MORIN
1,638,504
WATERPROOFED INSOLE
Filed Aug. 31, 1925
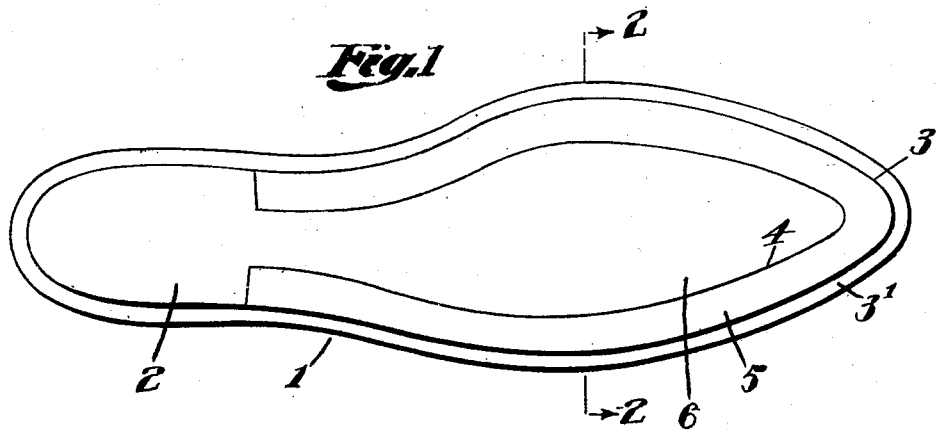
Inventor
Charles A. Morin
By
Attorney Patented Aug. 9, 1927.

1,638,504

UNITED STATES PATENT OFFICE.

CHARLES A. MORIN, OF BOSTON, MASSACHUSETTS.

WATERPROOFED INSOLE.

Application filed August 31, 1925. Serial No. 53,511.

In the production of insoles for shoes, it is customary to channel the insole to provide an out-turned stitch anchoring lip for the welt and upper which lip is afterwards cemented and laid back on the insole. The tendency of the lip is to curl over upon itself at its free edge, particularly where the insole is wetted preparatory to channeling, and this curling makes it difficult to lay the lip back smoothly and tightly on the insole.

In order to overcome the tendency of the lip to curl back and at the same time to insure proper waterproofing of the shoe, I cover the entire inside face of the insole, within the usual feather thereof, with a layer of waterproofing material which is coated on and adhered to the insole before the insole is rounded and channeled. The channel cut is, therefore, carried through both the waterproofing layer and the insole proper, thus providing a stitch anchoring lip of extra thickness, which lip when cemented and laid back upon the insole after the upper has been lasted thereto, is sealed at its inner edge by the waterproofing material. The channel cut is therefore definitely closed and sealed and the free edge of the lip is positively prevented from curling back.

In addition to its waterproofing function, the layer of waterproofing material has the further function of serving as a bottom filler for the shoe, thus avoiding the use of the usual granulated cork and similar bottom fillings which have to be applied as a separate operation in the manufacture of the shoe. By using waterproofing layers of various thickness according to the thickness of the upper stock and welting, I am enabled to build up a unitary bottom filler of any desired type and inasmuch as this bottom filler is applied as a layer of uniform thickness to the insole in such a way as to become an integral part thereof, the tendency of the filler to creep or become bunched under the foot, as happens with the ordinary loose granular filler, is wholly avoided.

The construction and manner of producing my insole, together with selected embodiments which illustrate the principles involved, are described and shown in the accompanying specification and drawings, and the characteristic features of novelty are particularly pointed out in the appended claims. Throughout the specification and the drawings like reference characters are employed to indicate corresponding parts, and in the drawings:

Fig. 1 is a plan view of one form of insole in accordance with my invention.

Fig. 2 is a section on the line 2—2, of Fig. 1.

I have indicated generally at 1, Figs. 1 and 2, an insole of conventional form. Coated on and adhered to the inner face of the insole before it is rounded and channeled is a layer 2 of waterproofing material which covers substantially the entire face of the insole. Such waterproofing layer 2 may be of any suitable kind. Preferably, it is a simple rubber cement, such as is commonly used in the industry, brushed onto the insole and which on drying adheres thereto as a hard, resilient and moisture repellant film. The insole is now rounded and channeled as indicated at 3 to produce a feather $3^1$ and is interiorly channeled as indicated at 4 to produce a stitch anchoring lip 5 which lip is cemented and laid back upon the insole after the upper has been lasted thereto.

When the lip is laid back upon the insole, the line of channel cut 4 is sealed by reason of the waterproofing character of the layer 2 and hence the free edge of the lip is positively prevented from curling back. I thus provide a composite insole consisting of a base 1 of leather or the like, and an overlying built-up layer 2 of waterproofing material, which when channeled as at 4 affords a lip 5 of double thickness as well as an enclosed filler area 6 which is definitely superimposed upon the base layer 1 as a sheet of uniform thickness throughout. The layer 2 is coated onto the base layer 1, so as to be practically integral therewith, thus avoiding the tendency of the usual loose-filler to bunch and creep under the foot in the use of the shoe. By this arrangement, moreover, I avoid the necessity of filling the shoe by a separate filling operation, as is necessary with the usual granular filler. By reference to Fig. 2 it will be noted that the feather $3^1$ is skived and extends as a thin flexible edge area so as to reduce by as much as possible the tendency of the feather to form an objectionable ridge under the foot. The thin flexible feather $3^1$ is sufficiently soft and pliable as not to be uncomfortable should it become curled.

Various other modifications in the form and construction of my insole may obviously be made within the spirit and scope of my invention as defined by the appended claims.

What I therefore claim and desire to secure by Letters Patent is:

1. An insole comprising a base layer and a layer of waterproofing material superimposed thereon, said layers being channeled to provide an out-turned stitch-anchoring lip adapted to be subsequently turned down and cemented back in place after the shoe has been lasted with the waterproofing material sealing the opening formed by the channel cut so as to present a smoothly closed joint.

2. An insole comprising a base layer and a layer of waterproofing material superimposed thereon, said layers being channeled to provide an out-turned stitch-anchoring lip adapted to be subsequently turned down and cemented back in place after the shoe has been lasted with the waterproofing material sealing the opening formed by the channel cut so as to present a smoothly closed joint, the waterproofing material included between the lines of channel cut constituting a bottom filler definitely located on and practically integral with the base layer of the insole.

3. An insole comprising a base layer and a layer of waterproofing material superimposed thereon, said layers being channeled to provide an out-turned stitch-anchoring lip, the waterproofing material included between the lines of channel cut constituting a bottom filler definitely located on and practically integral with the base layer of the insole.

4. An insole comprising a base layer and a layer of waterproofing material superimposed thereon, said base layer being provided with a thin flexible feather, and both of said layers being channeled to provide an out-turned stitch-anchoring lip adapted to be subsequently turned down and cemented back in place after the shoe has been lasted with the waterproofing material sealing the opening formed by the channel cut so as to present a smoothly closed joint, the waterproofing material included between the lines of channel cut constituting a bottom filler definitely located on and practically integral with the base layer of the insole.

In testimony whereof I affix my signature.

CHARLES A. MORIN.